March 17, 1925.  1,530,465

C. J. ERICKSON
ICE CREAM BRICK CUTTER
Filed Oct. 20, 1923   4 Sheets-Sheet 1

WITNESSES
Inventor
CHARLES J. ERICKSON
By
Attorney

March 17, 1925. 1,530,465
C. J. ERICKSON
ICE CREAM BRICK CUTTER
Filed Oct. 20, 1923 4 Sheets-Sheet 3

WITNESSES
Guy M Spring
George V. Wright

Inventor
CHARLES J. ERICKSON
By Richard B. Owen
Attorney

March 17, 1925.
C. J. ERICKSON
ICE CREAM BRICK CUTTER
Filed Oct. 20, 1923

WITNESSES

Inventor
CHARLES J. ERICKSON

By
Attorney

Patented Mar. 17, 1925.

1,530,465

UNITED STATES PATENT OFFICE.

CHARLES J. ERICKSON, OF SALT LAKE CITY, UTAH.

ICE-CREAM-BRICK CUTTER.

Application filed October 20, 1923. Serial No. 669,846.

*To all whom it may concern:*

Be it known that I, CHARLES J. ERICKSON, a citizen of the United States, residing at Salt Lake City, in the county of Salt Lake and State of Utah, have invented certain new and useful Improvements in an Ice-Cream-Brick Cutter, of which the following is a specification.

This invention appertains to novel means for cutting and handling brick ice cream and the primary object of the present invention is to provide an improved machine, which will quickly and expeditiously cut ice cream into bricks with a minimum amount of labor on the part of the operator of the machine.

Another prime object of the invention is the provision of novel means for feeding the blocks of ice cream to the cutting mechanism for cutting the said blocks of ice cream into bricks, and novel means for adjusting the cutting mechanism relative to the means for receiving the bricks of ice cream.

A further prime object of the invention is the provision of novel means for permitting the adjustment of the machine, whereby different sized bricks can be cut.

A further prime object of the invention is the provision of novel means for delivering the bricks of cream cut, one at a time, to a conveyor belt, which is adapted to convey the bricks to the wrapping table.

A further prime object of the invention is the provision of a novel cutting mechanism for the ice cream, which embodies a pair of mating reciprocatory knives adapted to engage the blocks of ice cream to be cut at opposite points, and novel means for synchronously operating the knives.

A further object of the invention is the provision of novel means for synchronously operating the cutting knives and the means for delivering the cut bricks to the conveyor belt, whereby immediately after the cutting of the brick, the same will be delivered to the conveyor belt.

A still further object of the invention is to provide an improved machine for cutting brick ice cream of the above character, which will be durable and efficient in use, one that will be simple and easy to manufacture, and one which can be placed upon the market at a small cost.

With these and other objects in view, the invention consists in the novel construction, arrangement and formation of parts, as will be hereinafter more specifically described, claimed, and illustrated in the accompanying drawings, in which drawings:

Figure 1:
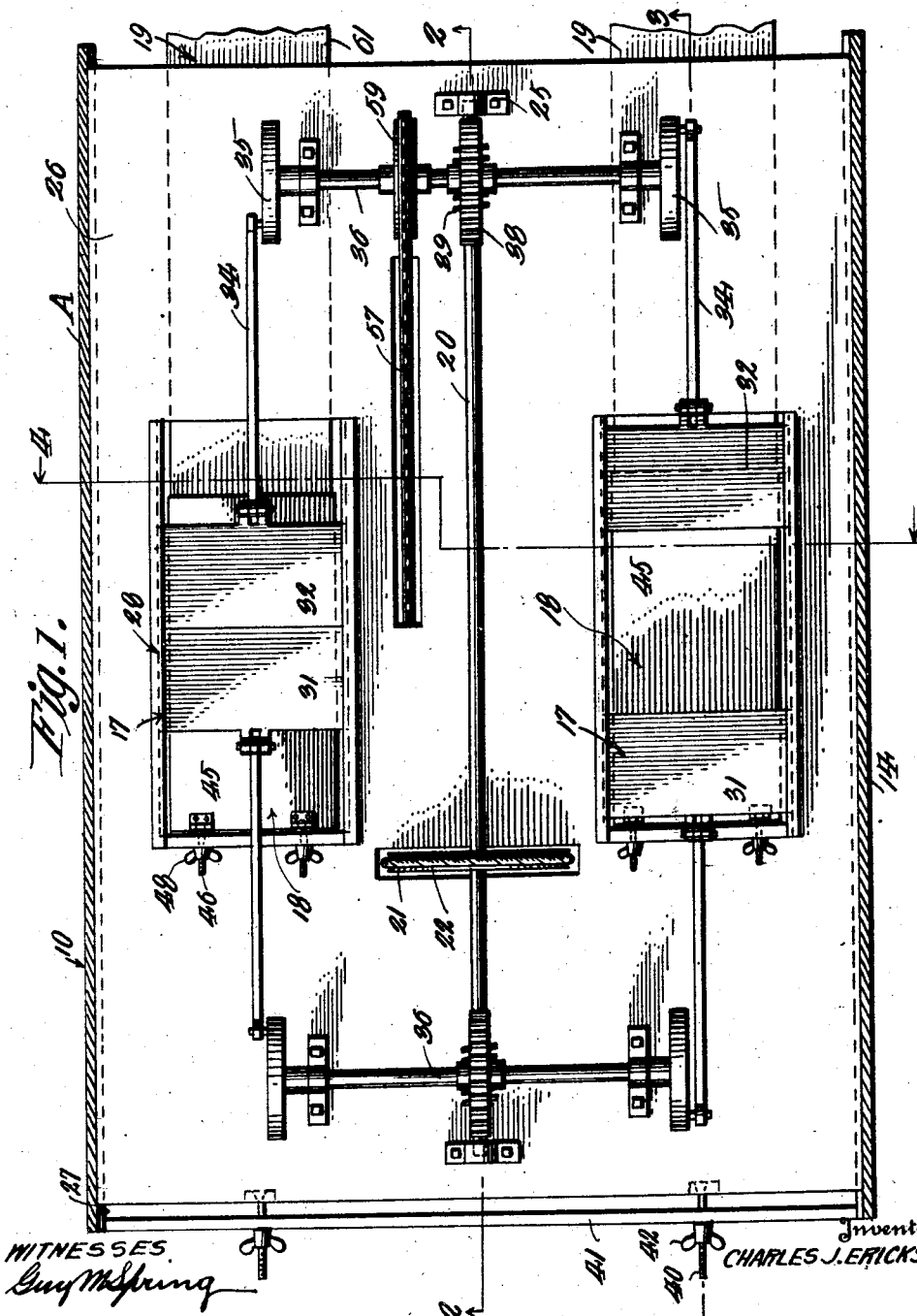
Figure 1 is a horizontal section through the improved ice cream brick cutter.
Figure 2:
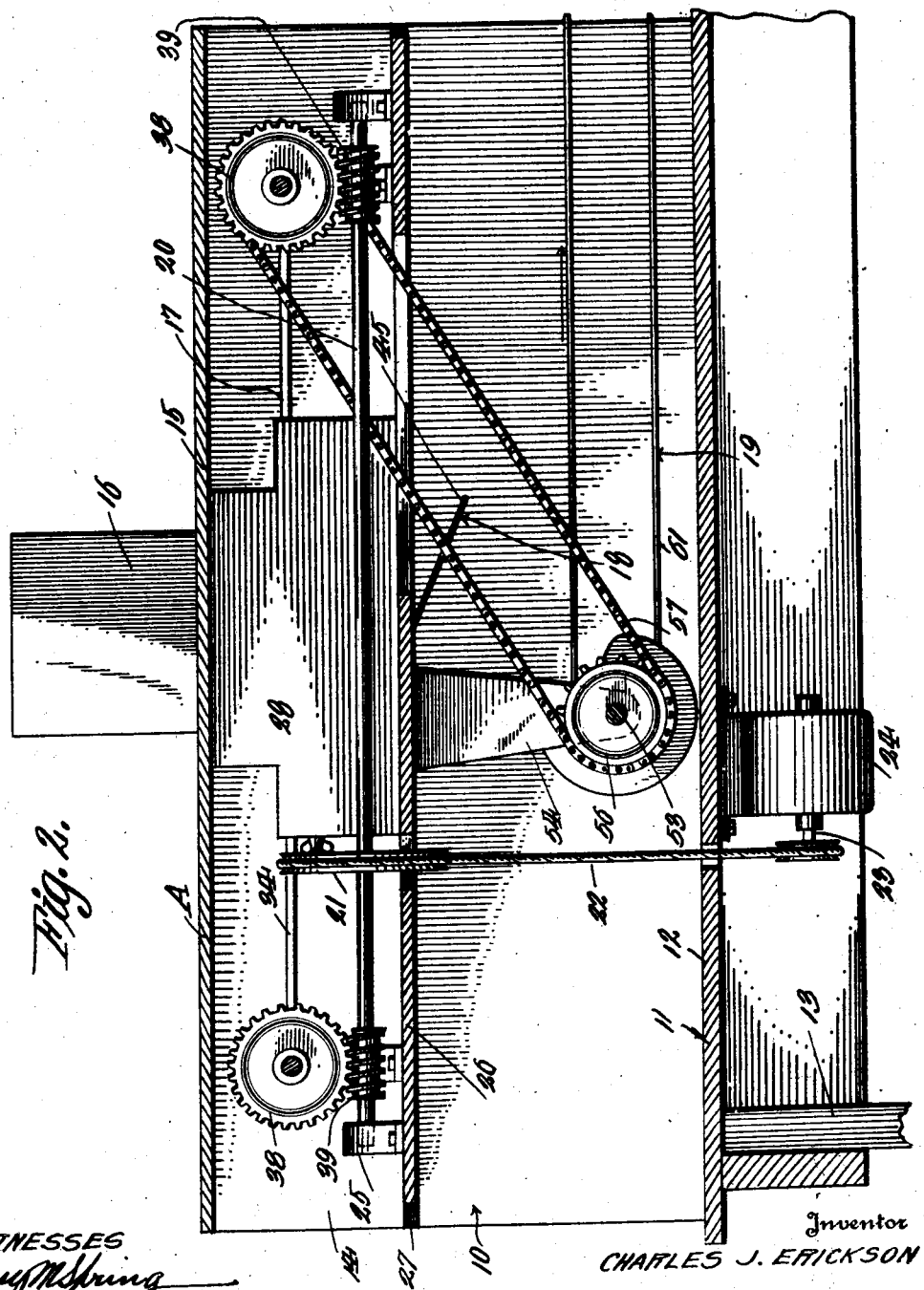
Figure 2 is a longitudinal section through the same taken on the line 2—2 of Figure 1.
Figure 3:
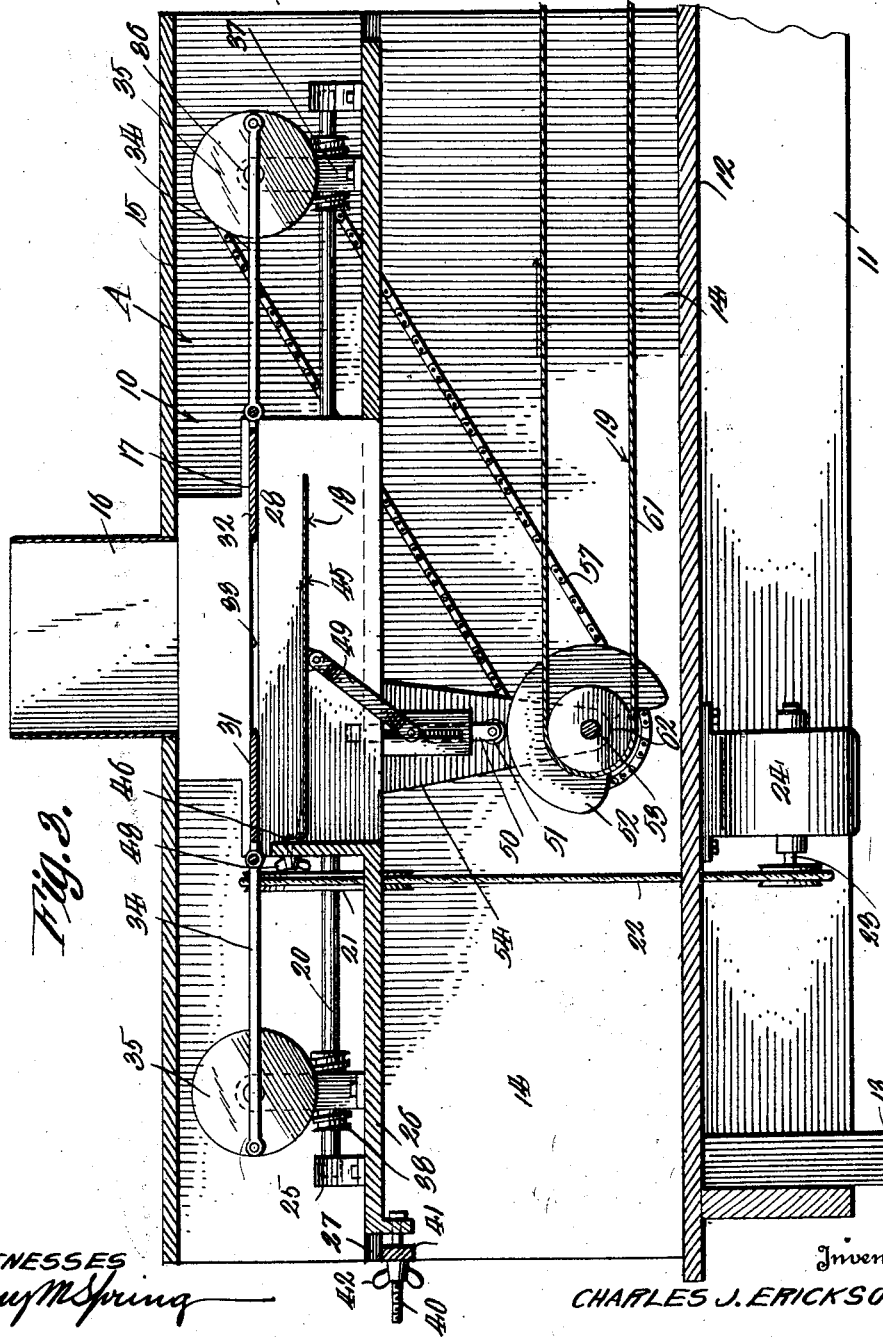
Figure 3 is a longitudinal section through the improved device taken on the line 3—3 of Figure 1 and illustrating the cutting mechanism and the means for delivering the cut bricks to the conveyor belt.
Figure 4:
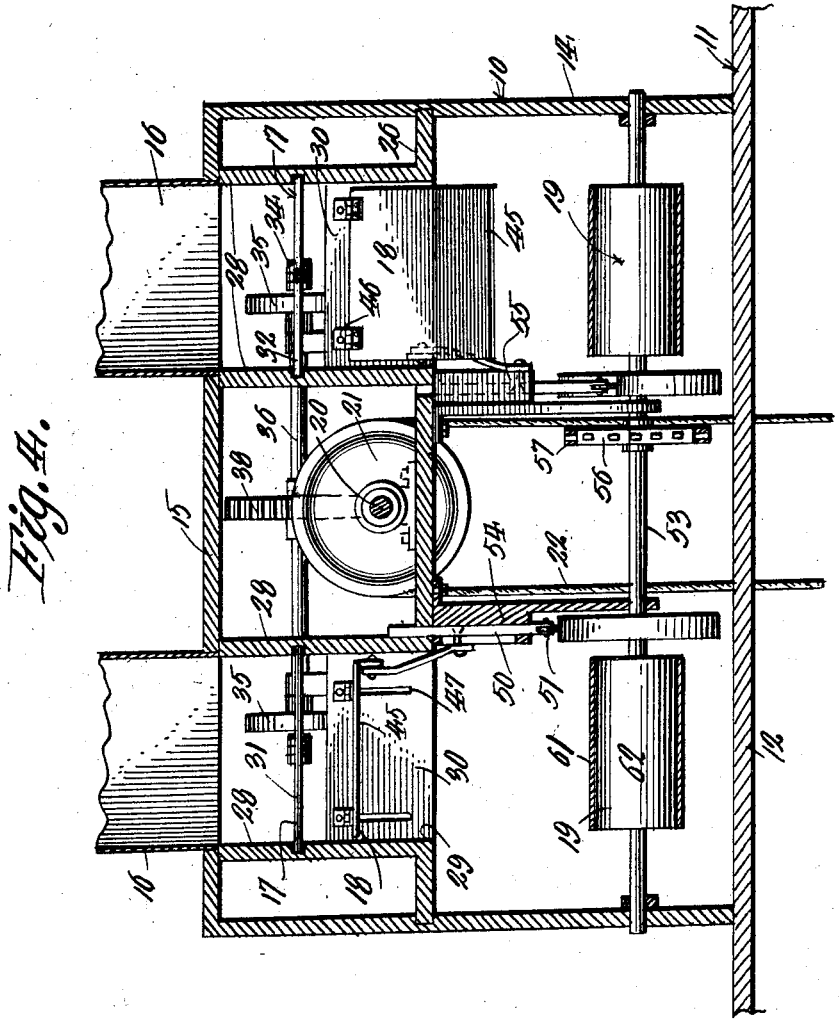
Figure 4 is a transverse section through the improved machine taken on the line 4—4 of Figure 1.

Referring to the drawings in detail, wherein similar reference characters designate corresponding parts throughout the several views, the letter A generally indicates the improved machine, which comprises a casing or frame 10, which is adapted to be placed upon a suitable supporting table or the like 11. This table 11 embodies a top 12 and suitable supporting legs 13. If so desired, the table 11 can be made of a relative great size and the machine A arranged at one end thereof, so as to permit the opposite end of the table to be used as means for wrapping the cut bricks.

In the drawings I have shown means for simultaneously cutting two blocks of ice cream into bricks, but it is to be understood, that the machine can be made to cut only a single block of ice cream into bricks at one time or for cutting any number of blocks of ice cream into bricks at one time.

The improved ice cream cutter 10, as stated includes the casing or frame 10 which embodies side walls 14 and a top wall 15, and the top wall 15 in this instance, is provided with a guide 16 on each side of its longitudinal center for receiving the blocks of ice cream to be cut. Arranged directly below each guide 16 is a novel cutting mechanism 17, the cut brick guiding means 18 and the conveyor belt 19. The cutting, guiding and conveying means arranged below each guide are of identically the same construction and therefore a description of one is deemed sufficient for both.

Arranged longitudinally within the frame or casing 10, below and between the guides 16 for the blocks of ice cream to be cut is the main drive shaft 20, which is operatively connected, in any preferred way, such as through the medium of pulleys 21 and a pulley belt 22, with the armature shaft 23 of electric motor 24. While I have shown the electric motor 24 for operating the drive shaft 20, it is to be understood that any other means can be provided for operating the same. The shaft 20 is rotatably mounted in suitable bearings 25 carried by a slide table 26, the longitudinal edges of which are slidably mounted within guideways 27 formed in the inner faces of the side walls 14 of the frame or casing 10.

The slide table 26 on each side of the shaft 20 is provided with a pair of upstanding guide boards 28 which are disposed directly below the guide chute 16. Below the guide boards 28 the slide table 26 is provided with an elongated opening 29 for permitting the dropping of the bricks of ice cream cut onto the conveyor belts 19. At the outer end of each pair of guide boards 28 is disposed an upright supporting plate 30 which adjustably supports the means for guiding the bricks of ice cream cut onto the conveying mechanism 19.

The cutting mechanism 17 disposed below each of the guide chutes 16 includes a pair of reciprocatory mating knives 31 and 32 which are slidably mounted in guide grooves 33 formed in the inner faces of the guide boards 28. The outer ends of the mating cutting knives 31 and 32 have pivotally connected thereto oppositely extending pitman rods 34 which are in turn connected to crank wheels 35. These crank wheels 35 are keyed or otherwise secured to driven shafts 36 which are rotatably mounted in pairs of bearings 37. The bearings 37 are bolted or otherwise secured to the slide table 26 at each end of the guide boards 28. Each of the driven shafts 36 is provided with worm wheels 38 which mesh with worms 39 keyed or otherwise secured to the longitudinally extending drive shaft 20.

It is obvious from this construction that as the blocks of ice cream are fed through the guides 16 that the mating knives 31 and 32 will be synchronously operated to engage the block on each side thereof for cutting the same into bricks.

The slide table 26 can be slid longitudinally within the frame or casing 10 in order to permit the initial adjusting of the knives 31 and 32 and the guide boards 28 relative to the guide chutes 16, and in order to bring about the adjustment of the slide table 26 adjusting screws 40 are connected with one end of the table and these screws extend through a suitable end piece 51 secured to the side walls 14 of the frame or casing 10. An adjusting nut 42 is mounted upon each adjusting screw 40 for bearing against the cleat 41.

The means 18 provided for guiding the bricks cut by the mating knives 31 and 32 consist of a supporting platform 45, which is hingedly connected at its inner end to suitable supporting bolts 46. These bolts 46 are slidably mounted in guides 47 formed in the supporting plate 30, and it is obvious that by moving the bolts 46 in the slots 47 that the position of the platform 45 can be adjusted relative to the cutting knives 31 and 32, so that the desired size of bricks can be cut. The bolts 46 can be held in any desired adjusted position by means of suitable thumb nuts 48 threaded on the said bolts which are adapted to impinge against the supporting plate 30.

The platform 45 has pivotally connected thereto at a point intermediate its ends a link 49, which has its lower end pivotally connected to a reciprocating operating rod 50. The lower end of the operating rod 50 carries a roller 51 which is adapted to engage a cam 52 keyed or otherwise secured to a transversely extending shaft 53. This shaft 53 is rotatably carried by a pair of depending brackets 54 secured to the lower surface of the slide table 26. These brackets 54 also support guides 55 for the reciprocating slide rods 50. It is to be understood that there are two cam wheels 52 secured to the shaft 53 and that there is a platform 45 disposed below each guide chute and under the pairs of mating knives 31 and 32.

The shaft 53 has keyed or otherwise secured thereto a sprocket wheel 56 around which is trained a sprocket chain 57. This sprocket chain 57 is also trained about a sprocket wheel 59 keyed or otherwise secured to one of the driven shafts 36. By this construction, it can be seen that the cams 52 are operated synchronously with the pairs of cutting knives 31 and 32. The cams 52 are so constructed that the platforms are held in a raised position during the cutting strokes of the pairs of knives 31 and 32 but are lowered after the cutting strokes of the knives to permit the bricks of ice cream cut to fall on the conveying mechanism 19.

A conveying mechanism 19 is arranged below each platform 45 and includes an endless belt 60 which is trained about a roller 62 secured to the shaft 53. These conveyor belts 61 are adapted to lead to the forward end of the table top 12 in order that the bricks of ice cream can be conveniently grasped by persons to permit the wrapping up thereof.

In operation of the improved machine, the blocks of ice cream to be cut are placed into the guides 16 and the machine is set in operation. The pairs of knives 31 and 32 reciprocating back and forth will effectively cut the blocks of ice cream into the desired sized bricks and the platforms 45 will then drop the bricks cut onto the conveying mechanism 19, where the same are carried to the wrapping room.

From the foregoing description, it can be seen that I have provided an exceptionally simple and novel machine for expeditiously cutting blocks of ice cream into the desired size bricks with a minimum amount of labor on the part of the operators of the machine.

Changes in details may be made without departing from the spirit or the scope of this invention.

What I claim as new is:

1. In a machine for cutting ice cream blocks into bricks of a predetermined size, a guide chute for receiving the blocks of ice cream to be cut, a slide table, a pivoted platform carried by the slide table, means for cutting the blocks of ice cream into bricks disposed between the platform and the chute carried by said slide table and including a pair of reciprocatory mating cutting knives, and means for adjusting the slide table longitudinally relative to the guide chute.

2. In a machine for cutting blocks of ice cream into bricks of a predetermined size, a casing including side walls and a top wall, a pair of spaced guide chutes for receiving the blocks of ice cream carried by the top wall, a slide table mounted within the casing and supported by the side walls thereof mounted for movement longitudinally of the guide chutes, a longitudinally extending drive shaft disposed at the longitudinal center of the slide table, means for operating the drive shaft, pairs of longitudinally extending guide boards carried by the slide table and disposed below the guide chutes, pairs of reciprocatory cutting knives carried by each pair of guide boards, an adjustable pivoted supported platform disposed below each pair of cutting knives, driven shafts carried by the slide table and disposed at each end of the pairs of guide boards, means operatively connecting the driven shafts with the driven shaft, means operatively connecting the driven shafts with the pairs of cutting knives, a transversely extending driven shaft arranged below the slide table, a pair of cam wheels secured to the transversely extending driven shaft, a pair of slide rods carried by the slide table arranged to engage the cam wheels, and links operatively connecting the slide rods with the pivoted platforms.

3. In a machine for cutting blocks of ice cream into bricks, a guide for receiving blocks of ice cream to be cut, a pivoted platform arranged below and in spaced relation to the guide, cutting mechanism disposed intermediate the guide and platform for cutting the blocks of ice-cream into bricks, a conveyor belt arranged below the platform, and means for tipping the platform toward said conveyor belt after a brick of ice-cream has been cut from the block of ice-cream by the cutting mechanism including a cam wheel disposed below the platform, an operating rod engaging the periphery of the cam, and a link pivotally connected to the operating rod and to the platform at a point remote from its pivot.

In testimony whereof I affix my signature in presence of two witnesses.

CHARLES J. ERICKSON.

Witnesses:
GUSTAVE H. BACKMAN,
MILTON V. BACKMAN.